United States Patent [19]

Davis et al.

[11] Patent Number: 4,774,118
[45] Date of Patent: Sep. 27, 1988

[54] CRYOGENIC INSULATION SYSTEM

[75] Inventors: Randall C. Davis, Poquoson; Allan H. Taylor; L. Robert Jackson, both of Newport News, all of Va.; Patrick S. McAuliffe, Burbank, Calif.

[73] Assignee: The United States of America as represented by the Administrator of the National Aeronautics and Space Administration, Washington, D.C.

[21] Appl. No.: 60,182

[22] Filed: Jun. 10, 1987

[51] Int. Cl.[4] .................. B32B 1/00; B32B 3/26; B32B 7/12
[52] U.S. Cl. ..................... 428/71; 156/297; 156/299; 428/44; 428/47; 428/58; 428/76; 428/246; 428/251; 428/316.6; 428/473.5
[58] Field of Search ................ 220/901, 902; 428/71, 428/76, 316.6, 473.5, 44, 47, 48, 57, 58, 246, 251; 156/71, 297, 299, 300

[56] References Cited

U.S. PATENT DOCUMENTS

| 2,826,240 | 3/1958 | Meier et al. | 428/71 |
| 3,425,889 | 2/1969 | Willits, Jr. | 248/221.2 |
| 3,619,344 | 11/1971 | Wolinski | 428/317.7 |
| 3,769,118 | 10/1973 | Tariel et al. | 428/316.6 |
| 3,906,137 | 9/1975 | Bauer | 428/316.6 |
| 4,044,184 | 8/1977 | Ashida et al. | 428/316.6 |
| 4,117,947 | 10/1978 | Androulakis | 220/901 |
| 4,124,732 | 11/1978 | Leger | 428/77 |
| 4,151,800 | 5/1979 | Dotts et al. | 102/105 |
| 4,316,934 | 2/1982 | Maier et al. | 428/319.3 |
| 4,361,613 | 11/1982 | Bogner et al. | 428/316.6 |
| 4,463,043 | 7/1984 | Reeves et al. | 428/68 |
| 4,488,619 | 12/1984 | O'Neill | 428/316.6 |

FOREIGN PATENT DOCUMENTS 2000725  1/1979  United Kingdom ............ 428/316.6

*Primary Examiner*—William J. Van Balen
*Attorney, Agent, or Firm*—George F. Helfrich; John R. Manning; Charles E. B. Glenn

[57] ABSTRACT

Cryogenic foam insulation 20 is adhesively bonded to the outer wall of the fuel tank structure 10. The cryogenic insulation 20 includes square sheets 12 fabricated from an array of abutting blocks 14. Each block 14 includes a sheet of glass cloth 18 adhesively bonded between two layers of polymethacrylimide foam 16. Each block is wrapped in a vapor impermeable membrane 24, such as a polyimide-aluminum-polyimide composite laminate, to provide a vapor barrier. Very beneficial results are obtained by employing the present invention in conjunction with fibrous insulation 28 and an outer aeroshell 30, which is a hot fuselage structure having an internal thermal protection system.

6 Claims, 4 Drawing Sheets

CRYOGENIC INSULATION SYSTEM

ORIGIN OF THE INVENTION

The invention described herein was made in the performance of work under a NASA Contract and is subject to the provisions of Section 305 of the National Aeronautics and Space Act of 1958, as amended, Public Law 85-568 (72 Stat. 435; 42 USC 2457).

BACKGROUND OF THE INVENTION

This invention relates to thermal insulation and, more particularly, to reusable, low density, high temperature cryogenic foam insulation systems and processes for their manufacture.

A pacing technology for liquid hydrogen fueled, high-speed aircraft is the development of a fully-reusable, flight-weight, cryogenic insulation system for propellant tank structures. Previously developed cryogenic tank insulation systems have employed low density polymeric foam materials with good success, however, they are not reusable. The current state of the art in insulation systems for flight-weight cryogenic containment vessels is a spray-on foam insulation (SOFI) system. This material is a rigid closed cell polyurethane foam which has excellent insulation qualities at low temperatures. This material is quite fragile and is often reinforced and/or coated to improve its durability with subsequent increases in density and conductivity. Also the material begins to decompose at 255° F. and therefore is limited to a 175° F. maximum use temperature. Materials of this type cannot withstand the temperatures generated by aerodynamic heating encountered during high speed flight and therefore require a separate thermal protection system to maintain the cryogenic insulation below its maximum use temperature.

The transition from current-art expendable launch vehicles to advanced liquid hydrogen fueled aircraft will require more efficient cryogenic insulation systems that are stronger and more thermally resistant to the hypersonic flight environment. Additionally, the cryogenic insulation systems must provide adequate thermal insulation to minimize fuel boil-off, prevent the liquefaction of air on the outer tank wall, and most importantly must be fully reusable.

Accordingly, it is an object of this invention to provide a reusable, light-weight cryogenic foam insulation system that can withstand cryogenic environments of −425° F. while remaining thermally resistant to hypersonic flight environments of 400° F.

A further object of this invention is to provide a cryogenic foam insulation system that prevents permeation of gases and liquefaction of air on the outer tank wall and minimizes fuel boil-off.

A further object of this invention is to provide a cryogenic foam insulation system for the inner wall of a cryogenic fuel tank structure that is impermeable to both air and the cryogenic fuel.

Other objects and advantages of this invention will become apparent hereinafter in the specification and drawings which follow.

SUMMARY OF THE INVENTION

According to the present invention, the foregoing and additional objects are attained by adhesively bonding the cryogenic foam insulation to the outer wall of the fuel tank structure. The cryogenic insulation consists of square sheets fabricated from an array of abutting square blocks. Each block consists of a sheet of glass cloth adhesively bonded between two layers of polymethacrylimide foam. Each Kapton ®-Aluminum-Kapton ® (Kapton is a brand of polyimide tape commercially available from E.I. Du Pont de Nemours, Inc. Wilmington, Delaware), to provide a vapor barrier. Very beneficial results are obtained by employing the present invention in conjunction with fibrous insulation and an outer aeroshell, viz., a hot fuselage structure with an internal thermal protection system.

DETAILED DESCRIPTION OF THE INVENTION

Figure 1:
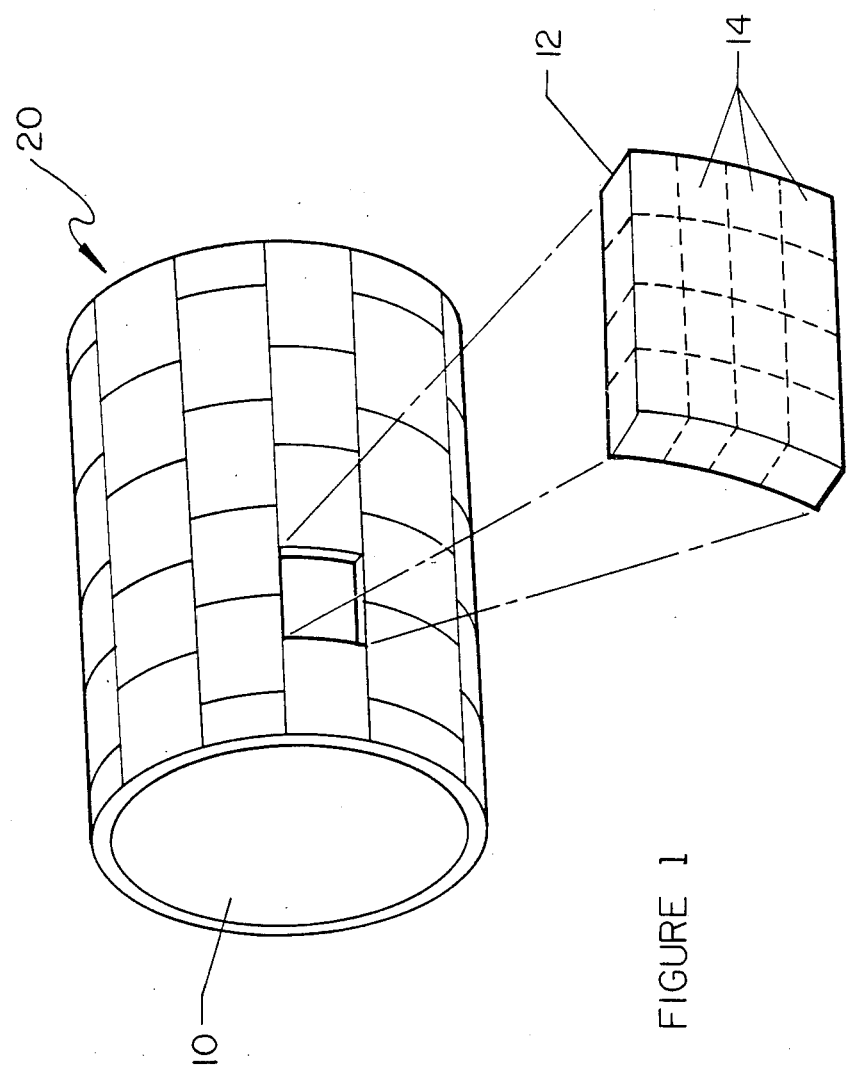
FIG. 1 is an exploded perspective view showing sheets of cryogenic foam insulation adhesively bonded to the outer wall of a cryogenic fuel tank structure, and an enlargement of a sheet of foam insulation showing the individual blocks of the present invention.

As illustrated in FIG. 1, the present invention comprehends adhesively bonding cryogenic foam insulation system 20 to the outer wall of a cryogenic fuel tank structure 10. The cryogenic foam insulation system 20 consists of square sheets 12 fabricated from an array of abutting square blocks 14 which are essentially identical to each other.

Figure 2:
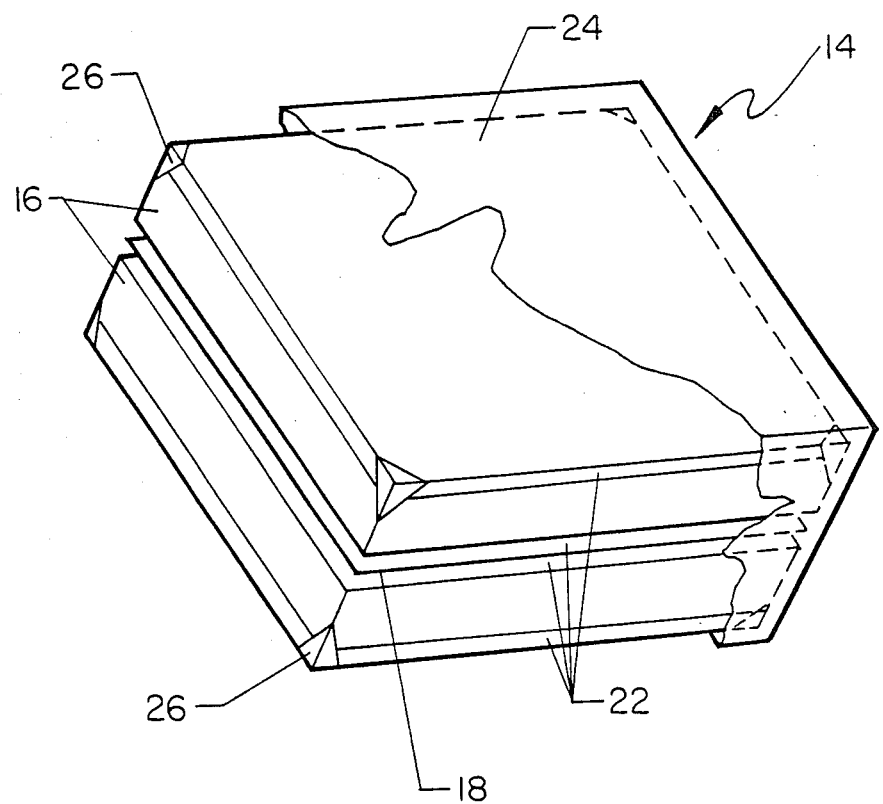
FIG. 2 is an exposed view of a representative foam insulation block according to the present invention.

Referring now to FIG. 2, the structure of the abutting square blocks 14 of the present invention includes discrete layers of polymethacrylimide foam which have been heat treated to preshrink the foam and remove volatiles which are detrimental to further processing. The layers of heat treated foam 16 are bonded together using a sheet of film adhesive 22 on each side of a sheet of glass cloth 18. The sheet of glass cloth 18 provides a vapor barrier and structurally reinforces the foam insulation system 20 to inhibit cracking. In the preferred embodiment, the outer corners of each square block 14 are machined to provide recesses to accept metal corner reinforcements 26, which strengthen the edges to prevent crushing, seal the corners to prevent permeation by gases, and provide an impervious bonding surface for the vapor impermeable covering layer 24 to prevent ingress of gases which would increase the conductivity of the insulation system 20. Very beneficial results have been obtained using a covering layer 24 of Kapton ®-Aluminum-Kapton ® composite laminate.

Figure 3:
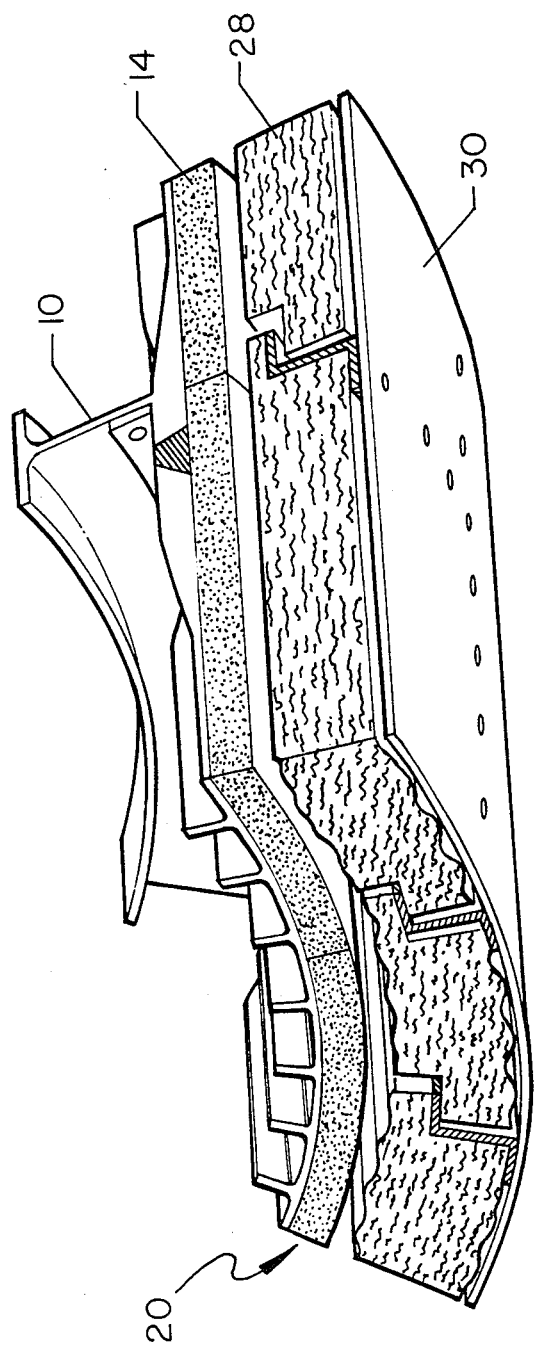
FIG. 3 is a cross-section of a preferred embodiment of the present invention used in conjunction with fibrous insulation and an outer aeroshell.

A preferred embodiment of the present invention is shown in detail in FIG. 3. In this embodiment, the foam insulation system 20 is used in conjunction with a layer of fibrous insulation 28 and an exterior thermal protection system 30. The higher service temperature of this cryogenic foam insulation system 20, which can withstand hypersonic flight environments to 400° F., requires less thickness and weight for this thermal projection system 30 than for prior art systems.

Figure 4:
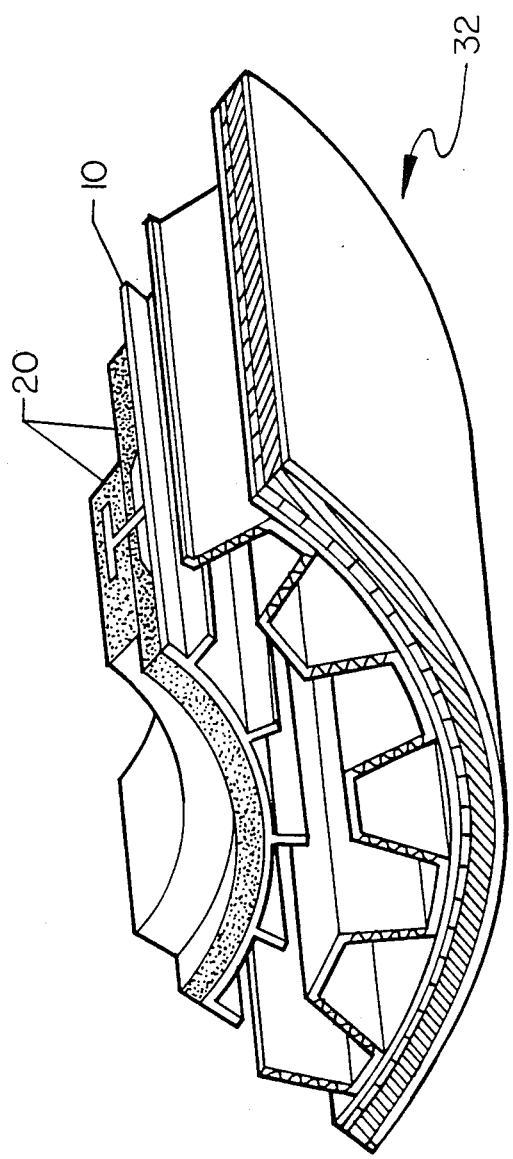
FIG. 4 is a cross-section of another preferred embodiment of the present invention showing the cryogenic foam insulation attached to the inner wall of a fuel tank.

A further preferred embodiment of the present invention is shown in FIG. 4. In this embodiment, the foam insulation system 20 is attached to the inner wall of a fuel tank structure 10. An outer wall construction system 32 is used in conjunction therewith to provide thermal protection.

It should become obvious to those skilled in the art that this invention is not limited to the preferred embodiments shown and described.

What is claimed as new and desired to be secured by Letters Patent of the United States is:

1. A reusable, high-temperature cryogenic foam insulation system for a cryogenic tank structure, said cryogenic foam insulation system capable of withstanding temperatures to 400° F., comprising:

a plurality of abutting foam insulation blocks;
each of said foam insulation blocks comprising:
  (a) a first and second layer of low density foam
  (b) a reinforcing layer disposed therebetween;
  (c) an adhesive layer bonding said reinforcing layer to said first and second layers of low density foam insulation;
  (d) said first layer of low density foam having the major exterior face thereof bonded adhesively to the cryogenic tank structure; and
a vapor impermeable covering layer adhesively bonded to the remaining exterior faces of said foam insulation blocks.

2. A reusable, high-temperature cryogenic foam insulation system according to claim 1 further comprising:
metal corner reinforcements for sealing the corners of said foam insulation blocks to prevent permeation of gases and for stregthening the corners of the foam insulation blocks to prevent crushing of said corners;
said metal corner reinforcements being adhesively bonded to each corner of said foam insulation blocks.

3. A reusable, high-temperature cryogenic foam insulation system according to claim 1 wherein said low density foam is polymethacrylimide foam.

4. A reusable, high-temperature cryogenic foam insulation system according to claim 1 wherein said vapor impermeable covering layer is a polyimide-aluminum-polyimide composite laminate.

5. A reusable, high-temperature cryogenic foam insulation system according to claim 1 wherein said reinforcing layer is a glass cloth.

6. A process for producing a high-temperature cryogenic foam insulation sytem capable of reusably withstanding temperatures to 400° F. comprising:
(1) constructing a plurality of abutting foam insulation blocks, each of said foam insulation blocks being formed by
  (a) providing a first and second layer of low density polymethacrylimide foam;
  (b) providing a reinforcing layer of glass cloth disposed therebetween;
  (c) adhesively bonding said reinforcing layer to said first and second layers of low density polymetharcylimide foam;
  (d) adhesively bonding the major exterior face of said first layer of low density polymethacrylimide foam to a cryogenic tank structure;
  (e) providing a vapor impermeable covering layer; and
  (f) adhesively bonding said vapor impermeable covering layer to the remaining exterior faces of the adhesively bonded low density polymethacrylimide foam layers; and
(2) bonding said abutting foam insulation blocks to a cryogenic tank structure, said foam insulation blocks completely covering the surface of said cryogenic tank structure.

* * * * *